United States Patent [19]
Loechner, II

[11] Patent Number: 5,815,802
[45] Date of Patent: Sep. 29, 1998

[54] TRAFFIC ALERT WARNING SYSTEM AND METHOD FOR ALERTING VEHICLE OPERATORS OF ROAD CONDITIONS

[75] Inventor: Henry A. Loechner, II, Waterbury, Conn.

[73] Assignee: Highway Technologies, Inc., Westport, Conn.

[21] Appl. No.: 680,633

[22] Filed: Jul. 16, 1996

[51] Int. Cl.$^6$ .............................. H04B 17/00; G08G 1/09
[52] U.S. Cl. .................. 455/67.1; 455/404; 455/515; 455/521; 340/905; 340/539; 364/436
[58] Field of Search .................................. 455/67.1, 404, 455/450, 464, 509, 521, 515; 340/902, 904, 905, 539; 364/436–438

[56] References Cited

U.S. PATENT DOCUMENTS

| | | | |
|---|---|---|---|
| 3,710,313 | 1/1973 | Kimball et al. | 340/902 |
| 3,760,349 | 9/1973 | Keister et al. | 340/539 |
| 4,013,994 | 3/1977 | Ragano et al. | 340/539 |
| 4,056,779 | 11/1977 | Toler | 455/58 |
| 4,335,468 | 6/1982 | Foster et al. | 455/58 |
| 4,352,201 | 9/1982 | Miller | 455/58 |
| 4,764,978 | 8/1988 | Argo | 340/902 |

*Primary Examiner*—Donnie L. Crosland
*Attorney, Agent, or Firm*—St. Onge Steward Johnston & Reens LLC

[57] ABSTRACT

A traffic alert warning system and method is provided for transmitting a road condition message to operators of vehicles when the system determines that a frequency channel to be used in broadcasting the message is not being used. The traffic alert warning system includes an activity level monitoring circuit for measuring the communication activity of the frequency channel, a channel availability logic circuit for determining if the frequency channel is available for transmission, a storage unit for storing a road condition message, and a transmitter assembly for transmitting the road condition message.

19 Claims, 7 Drawing Sheets

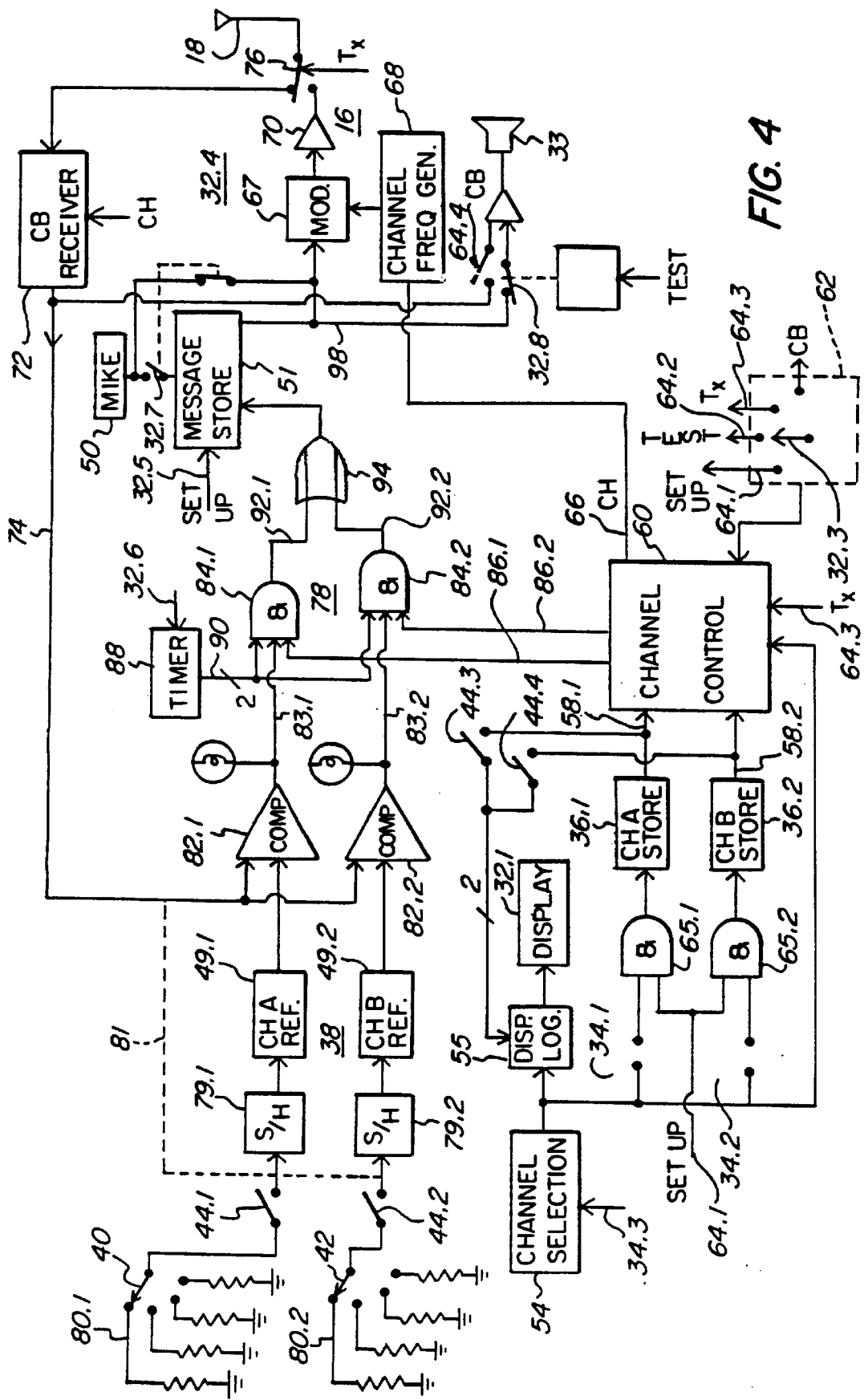

TRAFFIC ALERT WARNING SYSTEM AND METHOD FOR ALERTING VEHICLE OPERATORS OF ROAD CONDITIONS

FIELD OF THE INVENTION

The invention relates to a traffic alert warning system and method, and more specifically to a traffic alert warning system which broadcasts a road condition message over conventional Citizen-Band (CB) or other radio band channels.

BACKGROUND OF THE INVENTION

The present invention, although it applies to all vehicles, is especially designed to provide information to drivers of heavy trucks of road conditions ahead. Each year in the United States alone, trucks log more than 50 billion vehicle miles. And the number of miles logged by trucks increases yearly. This truck traffic, in addition to an ever increasing passenger vehicle traffic, results in a rising number of traffic accidents, with the attendant fatalities and injuries. Many traffic accidents involving trucks are caused by truck drivers being surprised by traffic slowdowns at road work sites or accident sites. Sudden traffic slowdowns are especially a problem for trucks since given their size and weight, they have lesser maneuverability and stopping ability than passenger vehicles.

Annually, over one hundred fifty road construction workers and over seven hundred vehicle occupants lose their lives due to traffic accidents at road work sites, many of which are caused by trucks. Therefore, it is imperative to provide a traffic alert warning system which can inform vehicle operators, especially truck drivers, of road conditions ahead, including hazards, obstructions and congested work sites.

Traffic alert warning systems are known in the art. For example, U.S. Pat. No. 4,216,545 to Flickshu et al. discloses a system for alerting users of Citizen-Band (CB) radios of an emergency condition. The system operates upon actuation of an emergency switch to transmit a tone signal to the various channels of CB radio networks. The emergency switch is contemplated to be incorporated as part of an impact switch in a motor vehicle so that upon collision, the emergency tone signal will be automatically sent out.

U.S. Pat. No. 4,764,978 to Argo et al. discloses a radio transmission apparatus for emergency vehicles, e.g. ambulances, the apparatus transmitting a radio frequency signal on both standard amplitude modulation (AM) and frequency modulation (FM) broadcast frequencies to alert vehicles in the path of the emergency vehicle that the emergency vehicle is approaching. The radio frequency is broadcast over the entire spectrum of the AM and FM broadcast frequencies.

U.S. Pat. No. 3,710,313 to Kimball et al. discloses a warning system having an FM transmitter mounted on an emergency vehicle and a frequency-adaptive device connected to a radio receiver in other vehicles for receiving transmissions from the FM transmitter.

These prior art traffic alert warning systems have been insufficient as solutions to the above-identified problem of truck drivers because they were not designed specifically with truck drivers in mind. As is known, truck drivers generally communicate by selecting a CB frequency channel (channel 19 being the most used channel) on a CB radio, then transmitting and receiving messages on the selected frequency channel. If one were to transmit a warning to truck drivers on a widely used channel (e.g., channel 19) about road conditions such as the occurrence of an accident, it would be likely that the warning would result in an interference with an ongoing communication on the channel and thus the warning would be muffled or be rendered unintelligible.

SUMMARY OF THE INVENTION

In accordance with one traffic warning system in accordance with the invention, a traffic alert system monitors one or more communication channels for transmitting a road condition message in such a manner that the transmission occurs only when the channel is "clear" (i.e., not being used to communicate). Not only does this prevent an undesired interruption of a communication taking place on the channel, but also assures that the road condition message will not be garbled by another communication on the channel.

As a result, a traffic alert warning system in accordance with the invention enables one to advise vehicle operators, especially truck drivers, of road conditions ahead of them, including road hazards, obstructions and congested work sites and accidents, while using often used and popular channels likely to reach the vehicle operators without creating interference problems.

An interference free communication of a traffic alert or road condition message is achieved in one embodiment of the invention by monitoring a channel and detecting channel traffic activity. When the detected channel activity appears to be greater than a preselected level, the channel activity continues to be detected on a regular basis until the detected activity drops below the preselected level or a predetermined number of attempts has been made. If the detected activity drops below the preselected level, the road condition message can then be transmitted over the channel with reduced likelihood of "stepping on" another transmission in the channel. The road condition message can be transmitted at such power level as appears needed to cover the desired distance; hence, a very low power level can be selected for a short distance communication.

The road condition message need not be limited to traffic delays but could warn of other hazards such a low temperature condition at which freezing conditions could exist on a bridge or at a rail crossing to alert oncoming traffic of an approaching train or of such other hazards or catastrophes as may arise. Different messages could be sent depending upon the road condition and the same or different messages could be sent over respective selected channels.

Accordingly, it is an object of the invention to provide a traffic alert warning system which transmits a road condition message to vehicle operators on a conventional communication channel that is selected by a user of the system and is likely to be listened to by the vehicle operators yet is unlikely to interfere with traffic on the channel.

A further object of the invention is to provide a traffic alert warning system which transmits a road condition message only when a frequency channel selected by a user is determined to be clear.

Yet another object of the invention is to provide a traffic alert warning system which permits a user to select a time interval between transmissions of a road condition message.

Still another object of the invention is to provide a traffic alert warning system with which a plurality of road condition messages can be sent and selected by a user of the system.

Another object of the invention is to provide a portable traffic alert warning system which permits a user to record a road condition message for transmission on the spot where the condition arises.

Still another object of the invention is to provide an array of traffic alert warning systems to extend the operating range for alerting vehicle operators approaching a road hazard.

These and other objects and advantages of the invention can be achieved by one traffic alert warning system in accordance with the invention in which the communication channels to be used in transmitting the road condition message are selected by a user with a channel selection circuit and an activity level monitoring circuit for measuring the communication activity of the selected channel is used. A channel availability logic circuit determines whether the frequency channel is available for transmission so that a road condition message placed in a storage unit can then be transmitted over the selected channel.

The invention and its particular features and advantages will become more apparent from the following detailed description considered with reference to the accompanying drawings.

BRIEF DESCRIPTION OF THE DRAWINGS

FIG. 4 is a more detailed block diagram of the traffic alert warning system of FIG. 1;

DETAILED DESCRIPTION OF THE INVENTION

Figure 1:
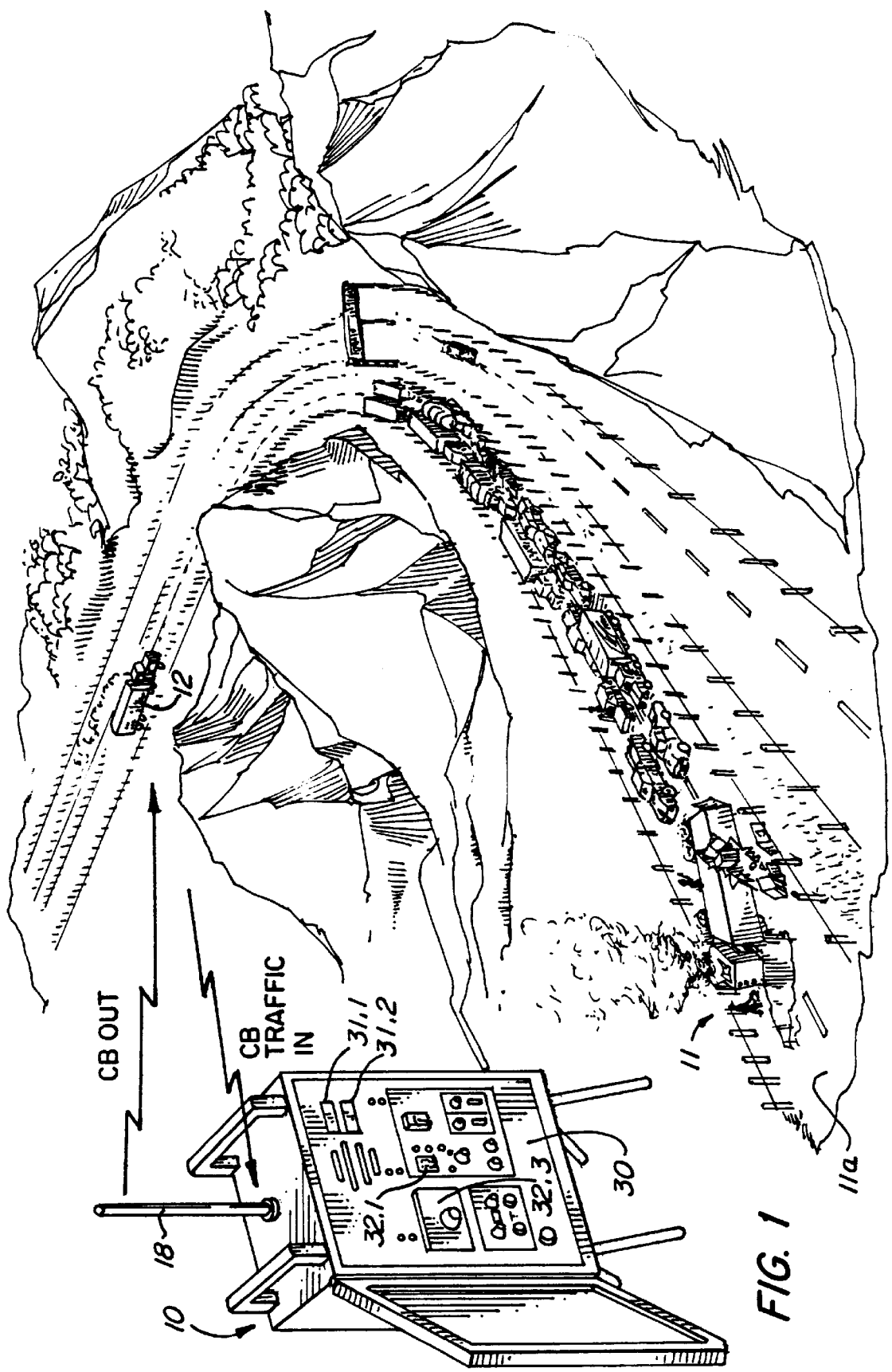
FIG. 1 is an exaggerated perspective diagram representative of a traffic slowdown caused by an accident with a traffic alert warning system of the present invention in use to inform oncoming traffic such as truck drivers of the slowdown.

With reference to FIG. 1, a traffic alert warning system 10 of the present invention, which is preferably a self-powered portable device operating in CB band channels, is shown placed alongside an accident 11 on a road 11a to transmit an appropriate warning message (e.g., "Accident one mile ahead—Expect traffic slowdown") to an oncoming truck 12 so that the truck driver will not be surprised by the traffic slowdown. The placement of the traffic alert warning system 10 depicted in FIG. 1 is for illustrative purposes only, and as will become apparent from the following, the traffic alert warning system 10 of the present invention will operate effectively in numerous different locations, such as a truck weighing station, on a standing or moving vehicle, in a surveillance airplane, at a rail crossing or on a train itself.

Figure 2:
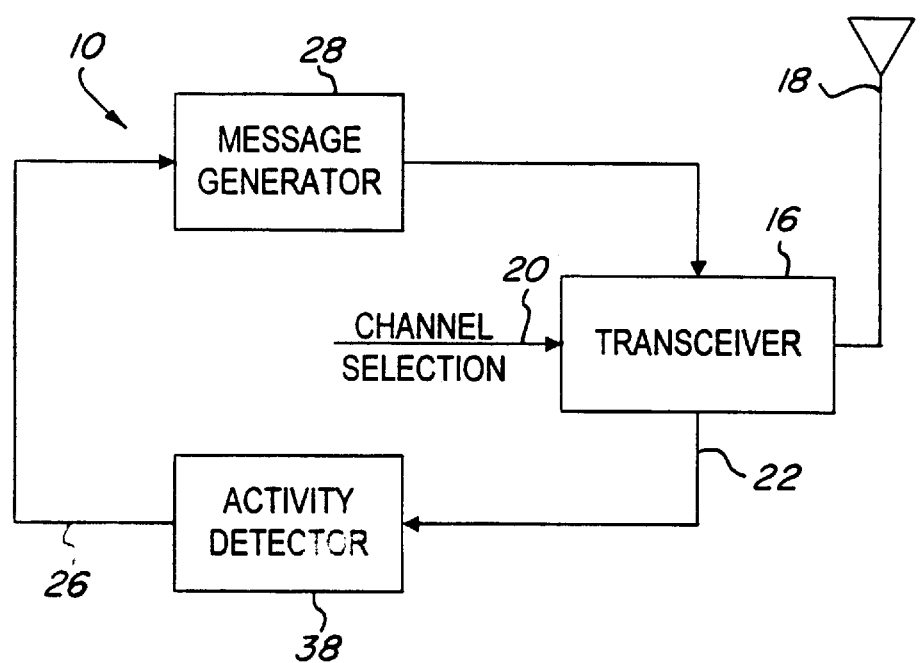
FIG. 2 is a block diagram illustrating a portion of the traffic alert warning system of the present invention.

As shown in FIG. 2, the traffic alert warning system 10 includes a transceiver 16 which sends and receives signals on a communication channel via an antenna 18. The transceiver 16 can be a typical CB transmitter and receiver operating at well-known frequency channels. Such CB transceivers typically have a channel selector, such as 20, which enables the reception of signals on a selected channel as well as transmission on the same channel when an appropriate transmit/receive button or an automatic transmit/receive circuit is activated. The transceiver can be battery operated or powered from a car battery or solar cells or the like.

Output 22 from the receiver segment of the transceiver 16 is coupled to an activity detector 38. The activity detector 38, as will be described in detail hereinafter, is a circuit that monitors the selected channel and determines when the channel activity is at a level representative of a clear condition. As soon as a clear condition is detected, a transmit signal is generated on line 26 to cause the generation of a message from a message generator 28. The message, which can be a prerecorded audio tape message or a digitally stored message, is applied to a suitable modulator in the transmitter segment of the transceiver 16 for transmission over the selected channel.

With the channel monitoring feature, the driver of truck 12 can be alerted of an upcoming road condition without interference with an ongoing communication on the channel, and thus, the driver of truck 12 is afforded an opportunity to exercise appropriate care to avoid crashing into the traffic back up at the accident scene 11.

Figure 3:
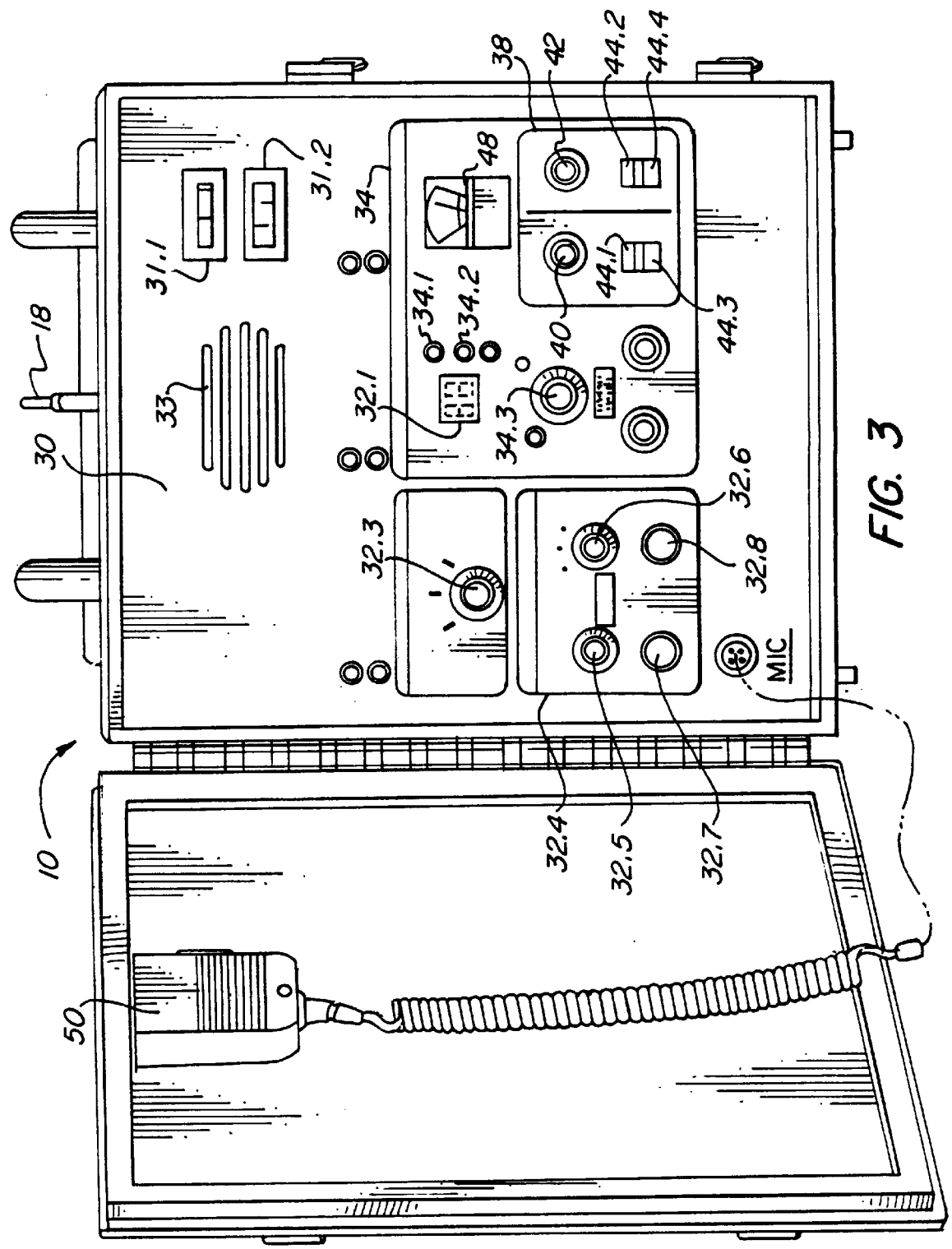
FIG. 3 is an enlarged perspective view of the front panel of the traffic alert warning system of FIG. 1.

With reference to FIGS. 1 and 3, the traffic alert warning system 10 has a front panel 30 exposed to indicate various controls used to operate the system 10. There is a channel selection display 32.1, a DC voltage indicator 31.1 (meter or a digital display) and a DC amps indicator 31.2 (meter or a digital display). At 32.3 is a mode selector with which the system 10 can be used in various operating states, such as setup, test, transmit, and standard CB use.

A message control section 32.4 is provided with various controls, such as control 32.5 with which different prerecorded messages can be selected for transmission in the transmit mode or different messages recorded during the setup mode, an interval selection control 32.6 to control the time intervals between message transmissions, and controls 32.7 and 32.8 to respectively enable the recording of a message and enable listening to a recorded message on a speaker 33.

A CB control section 34 is provided to enable the user to select channels to be monitored as well as the bases for channel activity determinations. Hence, different channel selections can be made with channel selector 34.3 and the corresponding channel numbers displayed on display 32.1. The displayed channel can be stored in suitable memory 36.1 or 36.2 (not shown In FIG. 1 or 3, but see FIG. 4) by the actuation of normally open push button channel switches 34.1 and 34.2.

Once the channel to be monitored has been selected, a channel activity reference level is selected with section 38 formed of variable reference signal controls having knobs 40 and 42. Signal levels in selected channels (in the embodiment shown, two channels are selected) can be displayed by positioning toggle switches (single-pole double-throw with center OFF) at 44.3 and 44.4. An average threshold signal level indicator 48 (meter or a digital display) is provided to visually indicate the signal levels in the selected channel.

Operation of system 10 commences with the recognition that an adverse road condition exists, which requires that oncoming traffic be issued a warning. The system 10 is therefore deployed near the applicable road site (e.g., in an emergency vehicle parked near the adverse road condition). The setup mode is then selected with the mode control knob 32.3. The CB channels or such other channels that are most likely to reach the most traffic are selected by first turning the tuning knob 34.3 to a channel of interest and then depressing one of the push button switches 34.1 or 34.2 to store the channel selection in memory 36.1 or 36.2 (see FIG. 4).

This channel selection can involve several channels over each of which is sent a warning. Such multiple channel selection can be made by using both of the switches 34.1 and 34.2. Alternatively more channels can be accommodated or the selection can be limited to just one channel. In the embodiment shown, two channels are selectable.

Once a channel is selected, its activity is visually monitored by observing the average threshold signal level indicator 48. In the present embodiment, the channel reference signal is then set by turning knob 40 or 42 to correspond to the average threshold signal level indicated by the indicator 48, and the channel reference signal is stored in memory 49.1 or 49.2 (see FIG. 4) by positioning appropriate toggle switch at 44.1 or 44.2. The stored amplitude is commensurate with the observed average threshold signal activity on the channel. Note that in another embodiment, the channel reference signal can be automatically set and stored in memory 49.1 or 49.2 by the system 10, obviating the need for knobs 40 and 42 and toggle switch positions 44.1 and 44.2. The same procedure is employed for additional channels if these are to be used. The stored activity reference signal enables the signal processor used in system 10 to determine when the channel is clear enough to "break in" with a road condition message.

A message selection is then made with section 32.4. This involves selection of a message interval rate with an interval selection control 32.6 which could produce timer signals at rates such as at intervals of every 20, 40, or 60 seconds. A special message can be recorded using a microphone 50 or a pre-recorded message can be used. Storing of the message in a storage unit 51 (see FIG. 4) can be on an audio tape or in digital format in appropriate memory.

The entire setup can then be tested in a test mode obtained with mode control 32.3 with sound only being produced through the speaker 33 and without an RF transmission through the selected channel. The test mode can then be followed with an automatic operational mode.

The traffic alert warning system 10 can be better understood by referring to FIG. 4. The traffic alert warning system 10 comprises conventional CB (Citizen Band) transceiver 16 having a channel selecting circuit 54 controlled by actuator 34.3. The channel selection circuit 54 is coupled to channel display 32.1, which can be a liquid crystal display (LCD), through a channel display logic 55, so that a user of the system 10 can view the selected channels.

Switches 34.1 and 34.2 couple the channel selection circuit 54 to first and second channel memories 36.1 and 36.2. The first and second channel memories 36.1 and 36.2 store signals representative of the channels selected by the user. Although the preferred embodiment of the present invention shows two channels being selected and stored for transmitting a road condition message, any number of channels may be selected and stored.

The outputs 58.1 and 58.2 of the first and second channel memory circuits 36.1 and 36.2 are coupled by normally open toggle switches 44.3 and 44.4 to the channel display logic 55 so that the user of the system 10 can selectively review what channels were selected and stored in the memories 36.1 and 36.2. The channel memory outputs 58.1 and 58.2 are coupled to a channel control logic circuit 60, which appropriately sequences the signals stored in the channel memories 36.1 and 36.2 to cause a transmission of a road condition message over the selected channels in the transmit mode.

A mode control circuit 62 includes a dial 32.3 and generates a setup enable signal on an output 64.1. This is coupled to the memories 36.1 and 36.2 through AND circuits 65.1 and 65.2 to enable channel(s) selected by the user to be stored. The mode control circuit 62 also generates a test mode signal on line 64.2 to enable the user to check channel selections and proper operation without transmitting over a selected channel.

The mode control circuit 62 also generates a transmit enable signal on output 64.3 which is coupled to the channel control logic 60. The transmit enable signal enables this logic circuit 60 to deliver a channel selection signal, CH 66, corresponding to the signal stored in one of the memories 36.1, 36.2 during a transmit or test mode. The mode control circuit 62 finally has a CB mode 64.4, which permits the user of the system 10 to carry on normal CB communication.

The output 66 of the channel control logic 60 is coupled to a conventional channel frequency generating circuit 68 used in a CB transceiver 16 and may, therefore, comprise suitable memory registers, an oscillator and a frequency divider circuit for generating the carrier frequencies corresponding to the selected channels stored in the memories 36.1 and 36.2.

The CB transceiver 16 comprises, as is conventional for these devices, a modulator 67 for AM modulating the selected carrier frequency with an audio signal, a transmitter 70, a receiver 72 having a demodulator to deliver an output signal on line 74 indicative of the signal activity in the channel in which a road condition transmission is to occur. A switch 76 is used between antenna 18 and the receiver 72 and transmitter 70 to control transmission/reception.

Switch 76 is preferably an electronically controlled switch so that, during automatic operation, a transmit and receive selection circuit 78 can automatically set the appropriate connection with antenna 18. Although the antenna 18 is part of the preferred embodiment, it need not be provided with the traffic alert warning system 10 of the present invention. The system 10 may be operated by simply connecting the system 10 to an external antenna which is already setup for transmission/reception.

The activity level monitoring circuit 38 is controlled by the actuators shown and described with reference to section 38 in FIG. 3 Circuit 38 includes sample and hold networks 79.1 and 79.2, each of which samples a reference signal set by the user of the system 10 turning knob 40 or 42 when the appropriate toggle switch 44.1 or 44.2 is activated. Note that each knob 40 and 42 operates to set a reference signal by employing a preselected set of fixed resistors (four in the present embodiment) 80.1 or 80.2 reflecting different signal levels indicated by the average threshold signal level indicator 48 (see FIG. 3). Alternatively, instead of fixed resistors 80.1 and 80.2, potentiometers can be employed in sampling reference signals. Each sampled reference signal is stored in one of the activity reference memories 49.1 or 49.2 depending upon which channel was selected.

During the transmit mode, the output 74 from the receiver 72 is applied with the outputs from the channel activity reference signals to comparators 82.1 and 82.2. The outputs 83.1 and 83.2 from the comparators in turn are respectively connected to AND gates 84.1 and 84.2 with channel enabling signals on output lines 86.1 and 86.2 from the channel control 60. The outputs on lines 83.1 and 83.2 are monitored with appropriate LED devices to indicate channel clear or busy states. Timing signals from an interval timer circuit 88 on line 90 are also applied to AND gates 84.1 and 84.2 to generate message enabling signals on their output lines 92.1 and 92.2 to initiate transmission. These transmissions occur, for example every 20, 40 or 60 seconds, as selected with the interval timer control 32.6.

Interval timer 88 can be a clock source set to produce transmission enabling signals either on a calendar basis, such as by setting an advance date on which for example construction is to begin, or on a regular interval basis as described.

The timer circuit 88 includes a message frequency selector circuit (not shown) which increments a counter, for example with every second elapsed as measured by clock pulses of a clock. Once the counter reflects the time interval selected by the user, the message frequency selector circuit resets the counter to zero and generates the message enabling signal on line 90.

When the receiver output 74 indicates a quiet channel, this condition is represented by a signal at the output of one of the comparators 82.1 or 82.2. With the selection of one of the channels as evidenced with a signal on a line 86.1 or 86.2 and the occurrence of a timer signal on line 90, a message enabling signal is produced and this is coupled through OR gate 94 to activate the generation of a message from the message storage unit 51. An audio message is then applied on line 98 to modulate the carrier signal associated with the selected channel for transmission to listeners. The carrier signal passes through the switch 76 and antenna 18. In this manner, a message is transmitted when the channel appears to be clear and then only at such repetition rate as is controlled by the interval timer control 32.6.

Figure 5A:
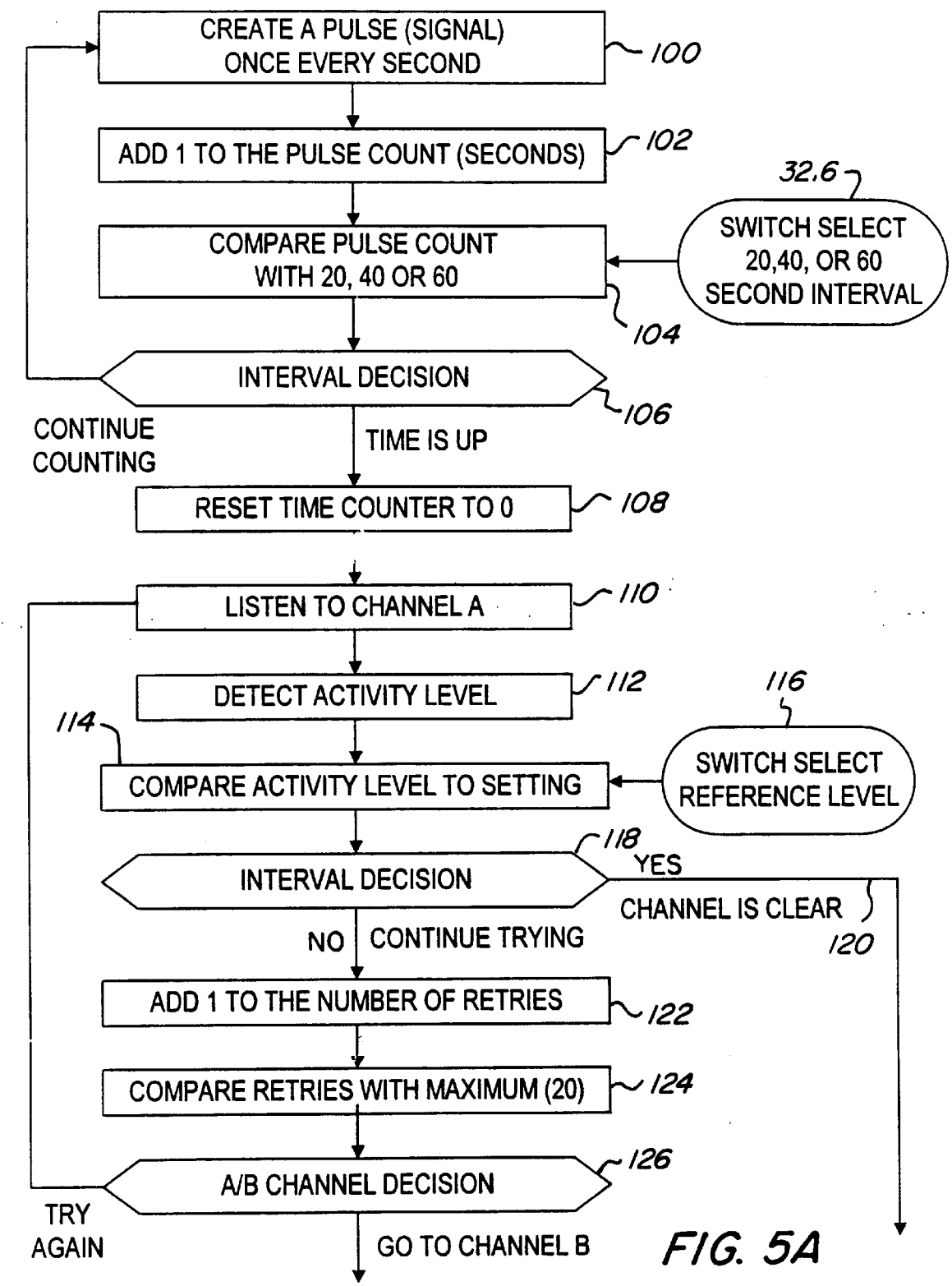
FIGS. 5A and 5B are segments of a flow diagram for a traffic alert warning system in accordance with the invention.
Figure 5B:
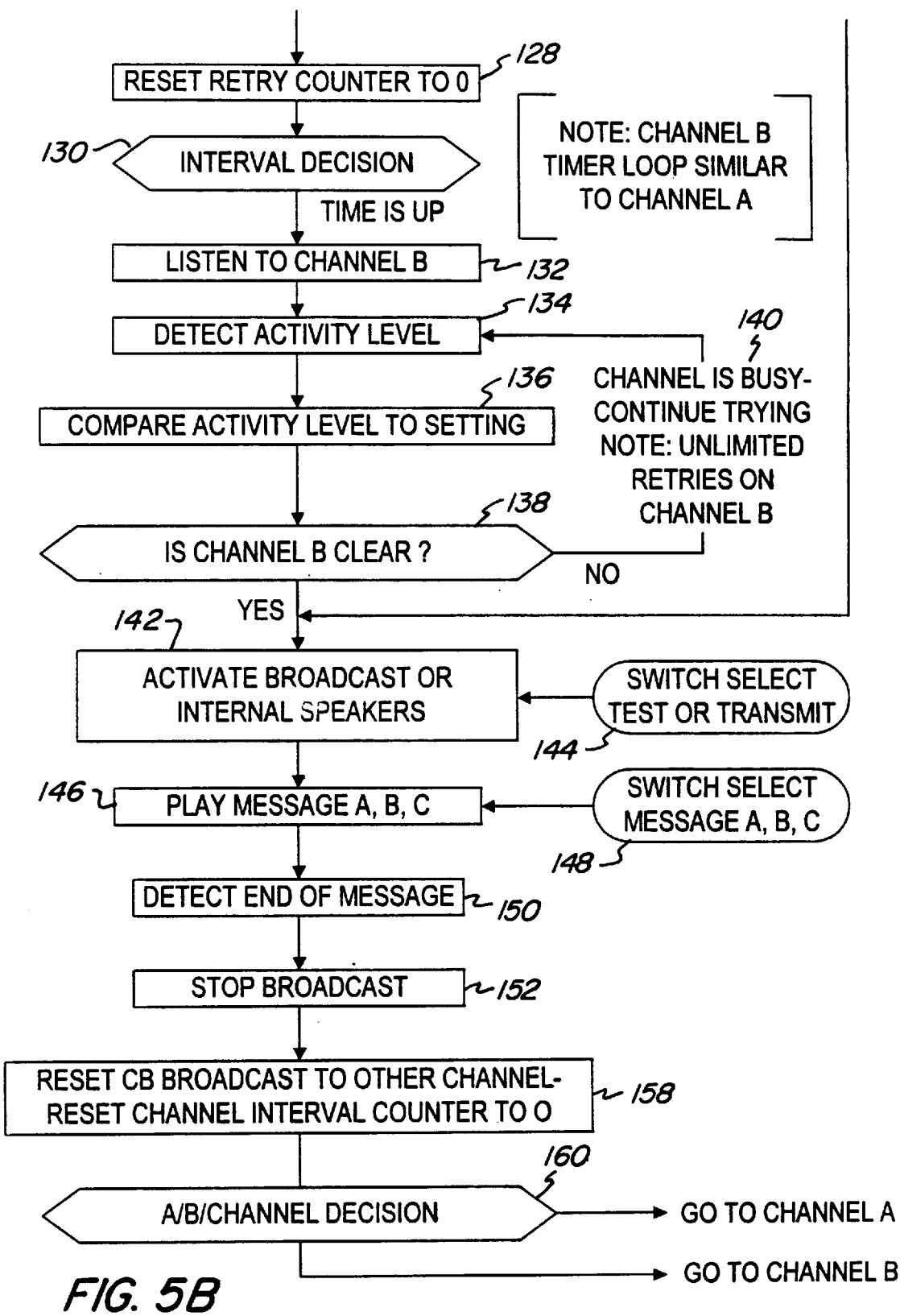

The above description involves use of specific components and circuits to achieve the invention. It is to be understood that the invention can also be achieved by employing a suitable microprocessor with which the functions of the circuits of the previous Figures can be obtained. With reference to FIGS. 5A and 5B, a flow diagram is shown for operating a microprocessor used in the traffic alert warning system 10 of the present invention.

At 100 in FIG. 5A, a clock signal is generated once every second (or some other predetermined interval) and stored in a counter at 102. At 104, the count stored in the counter is compared with a count represented by a selected time interval set by the time interval selector 32.6 as described with reference to FIG. 3. A decision is made at 106 whether the selected time interval has elapsed. If "No", then the system 10 returns to step 100. If the time interval has elapsed, then the counter is reset to zero at 108.

The first channel (Channel A) is then monitored starting at step 110 and its activity level determined at 112. A comparison is made at 114 between the activity level detected and the reference activity level previously stored during the set up mode. This reference level is set with switch 40 or 42 at 116 as described hereinabove. The comparison yields a signal indicative of the availability of the first channel for transmitting a message at 118. If the channel is clear, a message enable signal to that effect is produced on line 120. If the channel is busy, the system continues to make comparisons with steps 122, 124 and 126 for a maximum of attempts as determined at 124.

If the number of retries for the first channel is equal to the predetermined maximum number of retries as determined at 126, a decision is made to proceed with monitoring a second channel (Channel B). Looking at FIG. 5B, a retry counter for the first channel is reset to zero at 128. If the selected time interval (as set using the time interval control 32.6—see FIG. 5A) has elapsed, the second channel is then monitored in the same manner as done for the first channel at steps 132, 134, 136 and 138. The number of retries is determined by a predetermined period of time at 140.

At 142, if the user has selected using the mode selector 32.3 the transmit mode as determined at 144, the system 10 transmits at 146 a road condition message selected by the user at 148 on the available channel. If the user has selected the test mode at 144, then the system 10 activates the speaker 33 at 142 and broadcasts the road condition message selected by the user at 148 over the speaker 33. At 150, the end of the road condition message is detected and the transmission or broadcast terminated at 152.

At 158, the system 10 can automatically cause a resetting of transmission on one channel and select the other channel at 160. Further message transmissions can take place as described hereinabove.

As discussed above, with the message frequency selector circuit the time interval between successive transmissions of a road condition message can be selected. This is a useful feature to accommodate changing road conditions, where depending upon the road condition, the frequency of successive message transmissions can be adjusted appropriately. The traffic alert warning system 10 of the present invention may be modified in a manner apparent to those skilled in the art to become part of an array of traffic alert warning systems for transmitting a road condition message. Each system would be positioned within the receiving and transmitting range of another system of the array so that a message from one of the systems is capable of being received by any of the other systems in the array. This array of systems will permit any one of the individual systems to broadcast a message beyond its operating range so that traffic back-ups of several miles can be accommodated.

Figure 6:
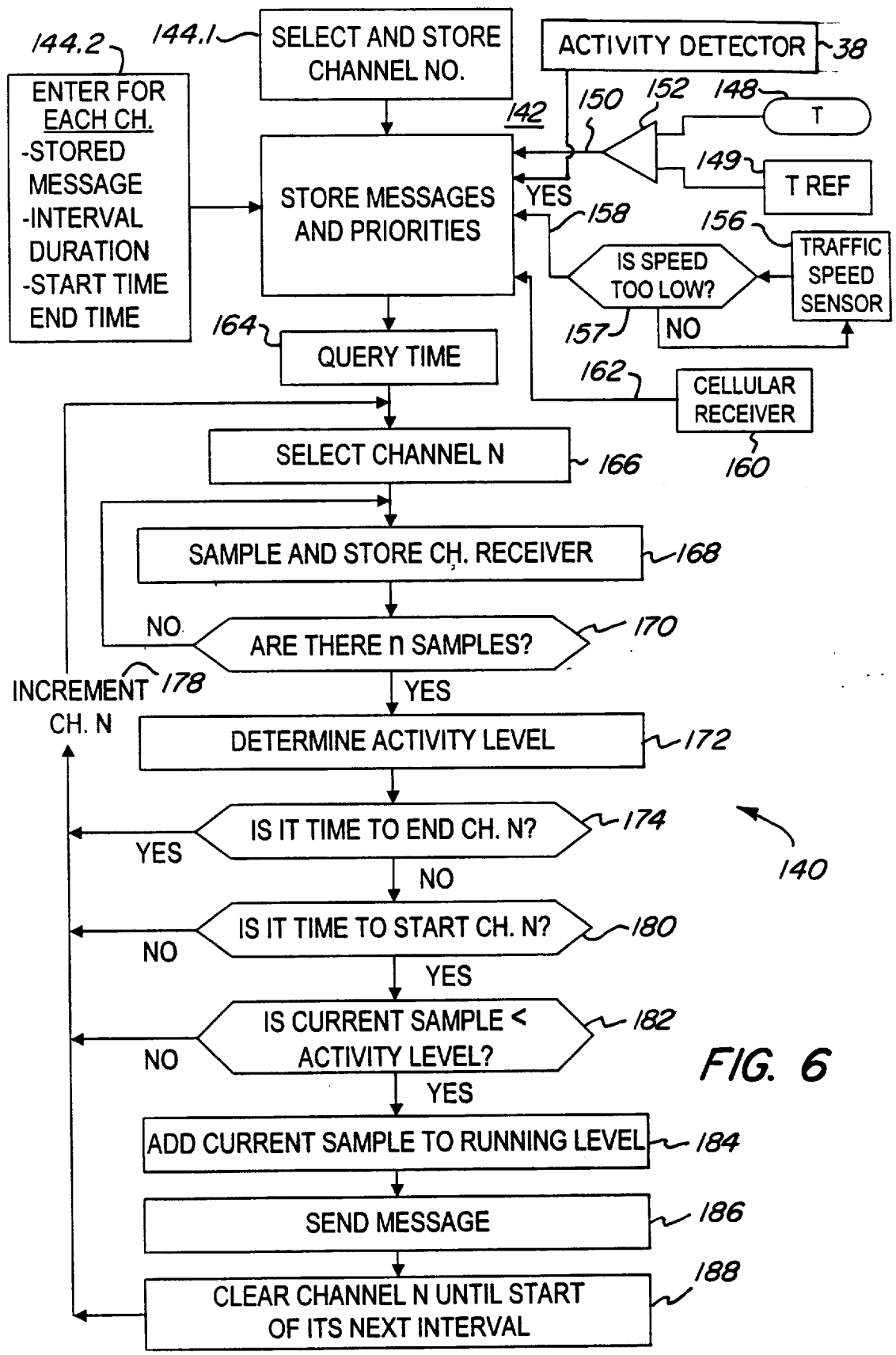
FIG. 6 is a flow diagram and block diagram for operation of a microprocessor in a traffic alert warning system in accordance with the invention.

With reference to FIG. 6, another traffic alert warning system 140 in accordance with the invention is shown. The system uses similar front panel controls as described with reference to FIGS. 1 and 3. These controls can be located in a separate unit, such as in the cab of a vehicle, to enable the operator to control communications from inside while the system with its antenna is located for example, in the bed of the truck.

System 140 uses a microprocessor 142 with memory which is programmed to operate in a sequence of steps as set forth in FIG. 6. Additional steps as may be necessary and are conventional in the operation of such processors are not shown for clarity. Thus, at 144.1 and 144.2, initialization of the setups and parameters used to operate the system are introduced. This includes the selection of the channels to be monitored at 144.1 and the entry, at 144.2, for each of the selected channels, the nature of the message to be sent, the rate at which messages are to be repeated, and the starting and ending times. If these parameters are not entered, then the system 140 can be made to employ default values.

It is recognized that emergency situations can arise whereby certain road conditions can become particularly hazardous. For example, when the outside temperature as sensed with a sensor 148 reaches 32 degrees F., a freezing condition could arise on bridges. In such a case, it would be desirable to warn oncoming traffic of this condition by placing the system 140 near the bridge or at such other suitable location and insert an appropriate warning message alerting drivers of the freezing hazard.

The warning can be made to arise automatically by comparing the temperature signal from the sensor 148 with a reference source 149 set at the danger level, producing a temperature warning on the output 150 of the comparator 152. The temperature warning signal can be applied directly to the microprocessor through an appropriate interrupt with which the program is forced to immediately recognize the occurrence of a temperature emergency. This temperature warning can also be entered manually whenever the situation warrants this.

Another automatic warning can be implemented with a traffic speed sensor 156. Whenever the traffic speed is deemed too slow, as determined at 157, a slow traffic warning signal is produced on line 158 and causes an interrupt that immediately produces a warning on the selected CB channels.

As in the traffic warning system 10 of FIGS. 1–5B, the system 140 can also be made to transmit a road condition message based upon the activity level detected on the selected channel. This is shown at 38.

Particular instructions could be entered by way of a cellular connection obtained from a cellular receiver 160 and applied on line 162 through a priority interrupt to the microprocessor 142.

One technique for operating the system 140 can be by commencing at 164 with querying the time of a clock kept within the processor 142. At 166, the first channel to be processed is determined from, for example, a channel processing counter. The channel corresponding to the number in the counter is selected at 166 and causes an appropriate output signal from the microprocessor 142 to the transmitter and receiver shown in FIG. 4.

At 168, the selected channel receiver output 74 (see FIG. 4) is sampled. The receiver output is sampled for a sufficient time period so as to be able to determine the activity level in the channel. This activity level can be an average of the signals from the receiver output over time. The sampling can be done for a number of instances, say each of the order of a several milliseconds, and with sixty four samples taken as obtained with steps 170 and 168. The values of each digital sample is accumulated in a register and then an average taken by dividing by 64 (dividing is done by shifting the accumulated count). The result is a measurement of the activity level as determined at 172 for the selected channel.

At 174, a test is made to determine whether it is time to end sending a message in the selected channel. If so a return is made to step 166 after first incrementing the channel register at 178 to a count associated with the next channel. If test 174 results in a negative decision, a test is made at 180 as to whether it is time to start monitoring the selected channel. If not, a return is made to step 166 after incrementing the channel counter at 178. If it is time or if the selected channel is being monitored, then at 182 a test is made as to whether the current sample is less than the activity level as measured at 172.

The test at 182 can be varied by taking different portions of the activity level or by requiring that the same result be achieved over a number of samples. The main feature being that the test result is indicative of a sufficiently quiet channel to enable the transmission of a road alert warning message.

If the sample is less than the stored activity level, the sample is added to the cumulative total at 184 and a warning message is sent out at 186. After the transmission, the selected channel is at 188 associated with a new transmission time and a return is made to step 166.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A traffic alert warning system operable in communication channels operating at different frequencies, comprising:
    a storage unit for storing a road condition message;
    means for monitoring a first of the communication channels and producing first channel signals indicative thereof;
    means responsive to the first channel signals for generating an activity level signal representative of the communication activity of the first communication channel;
    means for generating a first reference activity signal indicative of the activity level of the first channel over a predetermined time period;
    means for deriving an availability signal indicative of the availability of the first communication channel for transmitting the road condition message; and
    means responsive to the availability signal for enabling transmission of the road condition message in the storage unit.

2. The traffic alert warning system of claim 1, further comprising means for allowing a user of the system to select the time interval between successive transmissions of the road condition message.

3. The traffic alert warning system of claim 1, further comprising means for selecting the first communication channel.

4. The traffic alert warning system of claim 1, further comprising a message recording assembly connected to the storage unit, said message recording assembly comprising means for recording a road condition message.

5. The traffic alert warning system of claim 1, further comprising a speaker assembly connected to the message recording assembly to enable audio transmission of the stored road condition message.

6. The traffic alert warning system of claim 1, and further including an array of traffic alert warning systems spaced from each other and located within their respective operating ranges from each other so that a road condition message can be along an extended road length.

7. A traffic alert warning system operable in communication channels operating at different frequencies, comprising:
    means producing a road condition message;
    means for monitoring a first of the communication channels and generating channel signals indicative thereof;
    means responsive to the channel signals for generating an activity level signal representative of the communication activity of the first communication channel over a predetermined time period;
    means comparing the activity level signal with a channel signal and for producing an availability signal indicative of the availability of the first communication channel for transmitting the road condition message; and
    means responsive to the availability signal for transmitting said road condition message over said selected channel.

8. The traffic alert warning system of claim 7 and further comprising: means for enabling transmission of the road condition message over a second communication channel.

9. The traffic alert warning system of claim 7 and further comprising: means for generating a second availability signal representative of the availability of a second communication channel for transmission of a road condition message, and means responsive to the first availability signal for causing transmission of the road condition message over said second communication channel.

10. The traffic alert warning system of claim 9 and further comprising, means for enabling a user to select the second communication channel.

11. The traffic alert warning system of claim 7 and further comprising, means for selecting the time interval between successive transmissions of the road condition message.

12. The traffic alert warning system of claim 7 and further comprising: means for recording a road condition message.

13. The traffic alert warning system of claim 7 and further comprising: a display and means for causing a display of a channel designation associated with a selected communication channel.

14. A method of alerting vehicle operators of road conditions, comprising the steps of:

(l) providing a predetermined number of communication channels where each communication channel corresponds to a distinct predetermined frequency;

(ii) storing a road condition message in a storage unit;

(iii) monitoring a first of the communication channels by receiving channel signals indicative thereof;

(iv) generating an activity level signal from the channel signals, the activity level signal representative of the communication activity of the first communication channel over a predetermined time period;

(v) deriving an availability signal by comparing the activity level signal with a sample channel signal indicative of the first communication channel at a preselected time, the availability signal indicative of the availability of the first communication channel for transmitting the road condition message; and (vi) enabling transmission of the road condition message if the availability signal indicates the availability of the first communication channel for transmission.

15. The method of claim 14, further comprising the step of providing a new sample channel signal indicative of the first communication channel at a preselected time interval and repeating steps (v) and (vi) with the new sample channel signal if the availability signal indicates the unavailability of the first communication channel for transmission.

16. The method of claim 15, further comprising the step of determining the occurrence of the availability signal indicating the unavailability of the first communication channel for transmission and causing a second of the communication channels to be selected for steps (iii)–(vi) if the occurrence exceeds a preselected number.

17. The method of claim 14, further comprising the step of enabling transmission of the road condition message at a second communication channel if the road condition message is transmitted via the first communication channel.

18. The method of claim 14, further comprising the step of providing an actuator for selecting the first communication channel.

19. The method of claim 14, further comprising the step of providing a recording assembly for recording the road condition message.

* * * * *